United States Patent
McPherson, Sr.

(10) Patent No.: US 10,598,129 B2
(45) Date of Patent: Mar. 24, 2020

(54) FRAGMENTING NOZZLE SYSTEM

(71) Applicant: Aerojet Rocketdyne, Inc., Sacramento, CA (US)

(72) Inventor: Douglass McPherson, Sr., Frederickburg, VA (US)

(73) Assignee: Aerojet Rocketdyne, Inc., Orange, VA (US)

( * ) Notice: Subject to any disclaimer, the term of this patent is extended or adjusted under 35 U.S.C. 154(b) by 794 days.

(21) Appl. No.: 15/227,091

(22) Filed: Aug. 3, 2016

(65) Prior Publication Data

US 2016/0341151 A1    Nov. 24, 2016

Related U.S. Application Data

(63) Continuation-in-part of application No. PCT/US2015/028423, filed on Apr. 30, 2015.

(60) Provisional application No. 62/202,499, filed on Aug. 7, 2015, provisional application No. 61/988,680, filed on May 5, 2014.

(51) Int. Cl.
*F02K 9/97*    (2006.01)
*F02K 9/95*    (2006.01)

(52) U.S. Cl.
CPC .............. *F02K 9/974* (2013.01); *F02K 9/95* (2013.01); *F02K 9/97* (2013.01); *F02K 9/976* (2013.01); *F02K 9/978* (2013.01); *F05D 2300/211* (2013.01); *F05D 2300/2102* (2013.01); *F05D 2300/612* (2013.01)

(58) Field of Classification Search
CPC ... F02K 9/95; F02K 9/97; F02K 9/974; F02K 9/976; F02K 9/978
See application file for complete search history.

(56) References Cited

U.S. PATENT DOCUMENTS

| | | | | |
|---|---|---|---|---|
| 3,189,337 | A * | 6/1965 | North | C04B 28/24 264/43 |
| 3,237,402 | A | 3/1966 | Steverding | |
| 3,688,988 | A * | 9/1972 | Howison | F02K 9/34 102/378 |
| 4,022,129 | A | 5/1977 | Day et al. | |
| 4,384,454 | A * | 5/1983 | Engl | F02K 9/974 239/265.15 |
| 5,115,711 | A * | 5/1992 | Bushagour | F41F 3/042 89/1.816 |
| 5,894,723 | A * | 4/1999 | Gastal | F02K 9/978 239/265.15 |

(Continued)

OTHER PUBLICATIONS

Anonymous. (2014). Cyanate ester. Retrieved Jul. 6, 2015 from: https://en.wikipedia.org/wiki/Cyanate_ester.

(Continued)

*Primary Examiner* — William H Rodriguez
*Assistant Examiner* — Kyle Robert Thomas

(57) ABSTRACT

A fragmenting nozzle system includes a first nozzle at least partially disposed within a second nozzle. The first nozzle includes an ablative shell, a syntactic foam support disposed between the ablative shell and the second nozzle, and an ignition system disposed at least partially within the syntactic foam support. For example, the ignition system is operable to generate a controlled-energy deflagration pressure wave that fragments the first nozzle but not the second nozzle.

20 Claims, 4 Drawing Sheets

(56) References Cited

U.S. PATENT DOCUMENTS

| | | | | |
|---|---|---|---|---|
| 2008/0290191 A1* | 11/2008 | Facciano | ................. | B29C 70/28 239/265.11 |
| 2010/0210745 A1* | 8/2010 | McDaniel | .............. | C09D 5/008 521/55 |
| 2012/0264838 A1* | 10/2012 | Larson | ..................... | C09D 5/18 521/103 |
| 2014/0231695 A1* | 8/2014 | Doud | .................. | C04B 38/0645 252/62 |
| 2017/0158806 A1* | 6/2017 | Peters | .................. | C07D 405/12 |

OTHER PUBLICATIONS

International Search Report for PCT Application No. PCT/2015/028423 completed Jul. 6, 2015.
International Preliminary Report on Patentability for International Application No. PCT/US2015/028423 completed Nov. 8, 2016.

* cited by examiner

FRAGMENTING NOZZLE SYSTEM

CROSS-REFERENCE TO RELATED APPLICATIONS

The present disclosure claims priority to U.S. Provisional Patent Application No. 62/202,499, filed Aug. 7, 2015 and is also a Continuation-in-Part of pending International Application No. PCT/US2015/028423, filed Apr. 30, 2015, which claims priority to U.S. Provisional Patent Application No. 61/988,680, filed May 5, 2014.

BACKGROUND

This disclosure relates to propulsion systems and, more particularly, to a nozzle. Nozzles are used in propulsion systems, such as rocket motors, to provide a flow path for a propellant or propellants. Generally, the propellant expands through the nozzle to provide reaction forces, pressure, or thrust.

SUMMARY

A fragmenting nozzle system according to an example of the present disclosure includes a first nozzle at least partially disposed within a second nozzle. The first nozzle has an ablative shell, a syntactic foam support disposed between the ablative shell and the second nozzle, and an ignition system disposed at least partially within the syntactic foam support.

In a further embodiment of any of the foregoing embodiments, the syntactic foam support comprises benzoxazine.

In a further embodiment of any of the foregoing embodiments, the syntactic foam support includes benzoxazine resin and an ether.

In a further embodiment of any of the foregoing embodiments, the ether is selected from the group consisting of butyl glycidyl ether, cresyl glycidyl ether, neopentyl glycol diglycidyl ether, 1,4-butanediol diglycidyl ether, castor oil polyglycidyl ether, and combinations thereof.

In a further embodiment of any of the foregoing embodiments, the syntactic foam support includes fumed silica.

In a further embodiment of any of the foregoing embodiments, the syntactic foam support includes amorphous silica powder.

In a further embodiment of any of the foregoing embodiments, the syntactic foam support includes microspheres.

In a further embodiment of any of the foregoing embodiments, the microspheres are glass microspheres.

In a further embodiment of any of the foregoing embodiments, the microspheres are ceramic microspheres.

In a further embodiment of any of the foregoing embodiments, the syntactic foam support includes, by weight, 10%-40% of the microspheres.

In a further embodiment of any of the foregoing embodiments, the syntactic foam support includes, by weight, up to 15% silica.

In a further embodiment of any of the foregoing embodiments, the silica is selected from the group consisting of fumed silica, amorphous silica powder, silica glass fibers, and combinations thereof.

A fragmenting nozzle system according to an example of the present disclosure includes inner and outer convergent-divergent nozzles, the inner convergent-divergent nozzle lining an interior of the outer convergent-divergent nozzle and defining an initial nozzle throat geometry, and an ignition system operable to trigger a controlled-energy deflagration pressure wave across the inner and outer convergent-divergent nozzles. The inner convergent-divergent nozzle is formed of a fragmenting material with respect to the deflagration pressure wave and the outer convergent-divergent nozzle is formed of a fragment-resistant material with respect to the deflagration pressure wave such that upon triggering of the deflagration pressure wave, the inner convergent-divergent nozzle fragments and exposes a secondary, different nozzle throat geometry of the outer convergent-divergent nozzle.

In a further embodiment of any of the foregoing embodiments, the inner convergent-divergent nozzle includes a shell and a foam support. The shell includes cyanate ester and the foam support includes benzoxazine.

The system as recited in claim 14, wherein the foam support includes benzoxazine resin and an ether.

In a further embodiment of any of the foregoing embodiments, the ether is selected from the group consisting of butyl glycidyl ether, cresyl glycidyl ether, neopentyl glycol diglycidyl ether, 1,4-butanediol diglycidyl ether, castor oil polyglycidyl ether, and combinations thereof.

In a further embodiment of any of the foregoing embodiments, the foam support includes silica selected from the group consisting of fumed silica, amorphous silica powder, silica glass fibers, and combinations thereof.

In a further embodiment of any of the foregoing embodiments, the foam support includes microspheres.

In a further embodiment of any of the foregoing embodiments, the shell is a non-foam.

A fragmenting nozzle system according to an example of the present disclosure includes inner and outer convergent-divergent nozzles, the inner convergent-divergent nozzle lining an interior of the outer convergent-divergent nozzle and defining an initial nozzle throat geometry, and an ignition system operable to trigger a controlled-energy detonation pressure wave across the inner and outer convergent-divergent nozzles. The inner convergent-divergent nozzle is formed of a fragmenting material with respect to the detonation pressure wave and the outer convergent-divergent nozzle is formed of a fragment-resistant material with respect to the detonation pressure wave such that upon triggering of the detonation pressure wave. The inner convergent-divergent nozzle fragments and exposes a secondary, different nozzle throat geometry of the outer convergent-divergent nozzle

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
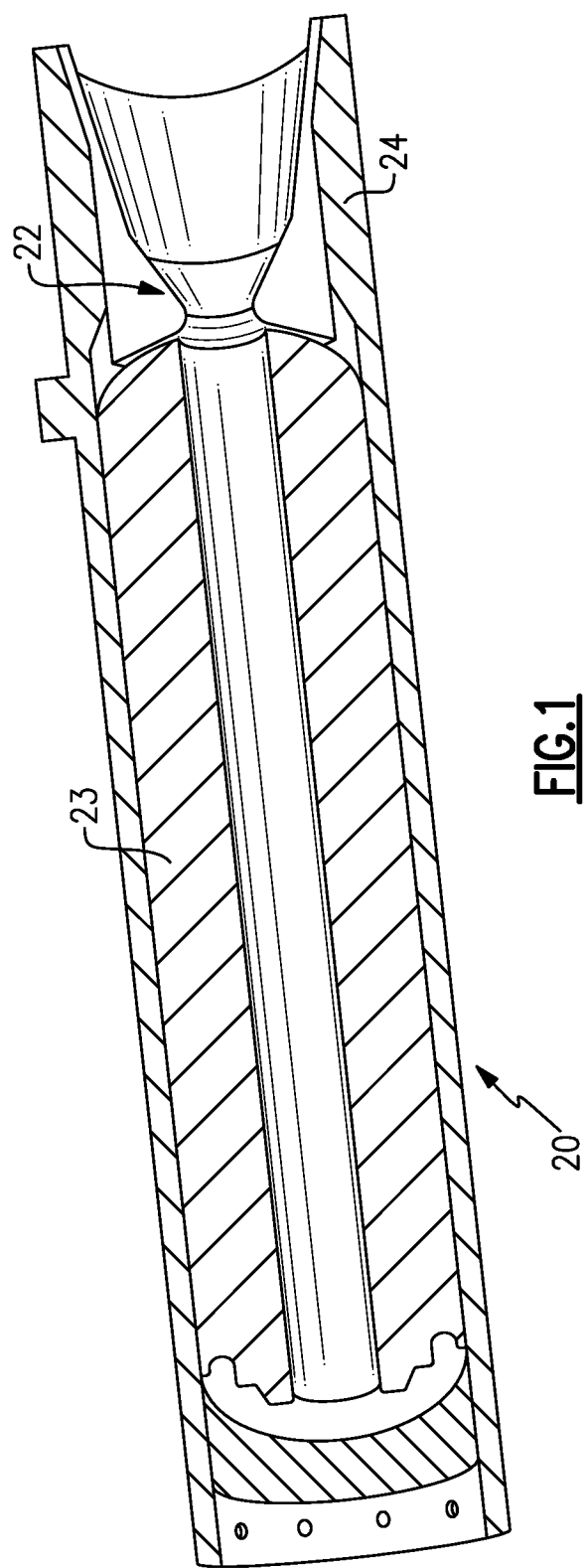
FIG. 1 illustrates an example rocket motor that has a fragmenting nozzle system.

FIG. 1 schematically illustrates a longitudinal cross-section through an example rocket motor 20 that has a fragmentable or fragmenting nozzle system 22. Although not limited, the rocket motor 20 may be a rocket booster that includes a solid fuel gas generator, such as a solid propellant grain 23 contained within the ramjet combustor that produces exhaust gases through the fragmenting nozzle system 22 to provide thrust. The examples herein are not limited to rocket motors and may be implemented in other types of vehicles. As will be described, the fragmenting nozzle system 22 enables dual mode operation using different nozzle throat geometries, as well as the ability to rapidly change from one mode to the other. For example, the modes of operation are different pressure modes for flow through the fragmenting nozzle system 22.

Figure 2:
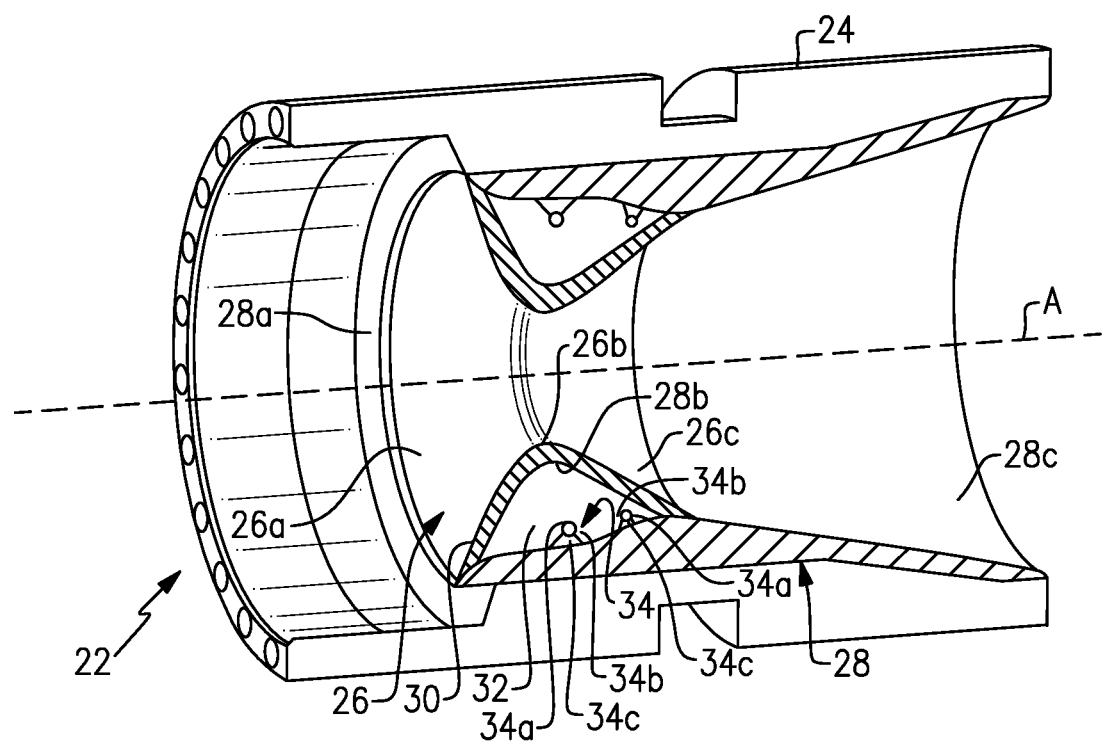
FIG. 2 illustrates a cross-section through a portion of the rocket motor and fragmenting nozzle system of FIG. 1.

FIG. 2 illustrates an isolated view of a cross-section through a portion of the rocket motor 20 and the fragmenting nozzle system 22. In this example, the fragmenting nozzle system 22 is within a case 24 of the rocket motor 20. The fragmenting nozzle system 22 includes a first (or inner) nozzle 26 and a second (or outer) nozzle 28. Each of the nozzles 26/28 are convergent-divergent nozzles (with regard to left-to-right flow in FIG. 2). The first nozzle 26 is located at least partially within the second nozzle 28. In this regard, the first nozzle 26 lines the interior of the second nozzle 28, although the axial lengths of the nozzles 26/28 may differ. The first nozzle 26, the second nozzle 28, or both may be fabricated from two or more arc segments.

The nozzles 26/28 include, respectively, convergent sections 26a/28a that narrow to respective throat sections 26b/28b that expand to respective divergent sections 26c/28c. As shown, the throat sections 26b/28b have different geometries with regard to at least minimum diametric size. The nozzles 26/28 may alternatively or additionally differ in other flow path geometries, such as the geometries of the throat angles with regard to the slope angles of the convergent sections 26a/28a and divergent sections 26c/28c to a plane that is perpendicular to the central axis A of the nozzles 26/28.

The first nozzle 26 is a multi-piece structure that includes an ablative shell 30 and a syntactic foam support 32 that is situated between the ablative shell 30 and the second nozzle 28. An ignition system 34 (for controlled, rapid removal or shedding of the first nozzle 26) is situated at least partially within the syntactic foam support 32 in this example. The ablative shell 30 is relatively strong for bearing thermal ablative and structural operational loads during use. The syntactic foam support 32 reinforces the ablative shell 30 but is also lightweight to reduce the overall weight of the fragmenting nozzle system 22.

In embodiments, the ignition system 34 is operable to trigger a controlled, low-energy pressure wave, to shed the first nozzle 26. For example, the ignition system 34 provides a low energy, deflagration-type, pressure wave. The term "deflagration," or variations thereof, refers to a rapid burn or combustion pressure wave that propagates at sub-sonic speeds. In contrast to deflagration, a "detonation" is a high-energy explosion shock wave that propagates at supersonic speed. The ignition system 34 and fragmenting nozzle system 22 herein may most typically be designed for deflagration-type ignition. In alternate embodiments, however, the ignition system 34 and fragmenting nozzle system 22 are designed for detonation-type ignition. Hereafter, the controlled, low-energy pressure wave will be referred to as a deflagration pressure wave, and it is to be understood that examples based on deflagration pressure waves may alternatively be based on high-energy waves from detonation-type ignition.

Both of the nozzles 26/28 are exposed to the deflagration pressure wave. The first nozzle 26 is formed of a fragmentable or fragmenting material with respect to the deflagration pressure wave and the second nozzle 28 is formed of a fragment- or pressure-resistant material with respect to the deflagration pressure wave. A fragmentable or fragmenting material substantially breaks apart into many small pieces or disintegrates to powder from the deflagration pressure wave. A fragment-resistant material does not break apart from the deflagration pressure wave. For example, the second nozzle 28 substantially maintains its geometric profile after the deflagration pressure wave.

Upon selective triggering of the deflagration pressure wave, the first nozzle 26 rapidly fragments and is shed or expelled from the rocket motor 20. For instance, the first nozzle 26 breaks apart into very small pieces that are no larger than approximately 3.5 inches and some of which are powder-sized; and within a period of less than 5 milliseconds the first nozzle 26 fragments and completely or substantially completely expels from the rocket motor 20. In further examples, the first nozzle 26 breaks apart into pieces that have a maximum dimension that is smaller than the minimum diametric size of the throat section 26b, to ensure that the pieces can be rapidly expelled.

The shedding of the first nozzle 26 rapidly exposes the different nozzle geometry of the second nozzle 28. Thus, the fragmenting nozzle system 22 can initially be used in a first operation mode, such as for a first operation pressure. The first nozzle 26 can then be removed or shed using the ignition system 34 such that the fragmenting nozzle system 22 can then be used in a second operation mode, such as for a second operation pressure. Moreover, since the fragmenting and expelling of the first nozzle is rapid, an operator can near-instantaneously change from the first mode of operation to the second.

In further examples, the first mode is a rocket boost mode to accelerate the rocket or vehicle, and the second mode is a sustain mode to maintain thrust or speed. The boost mode may utilize the solid propellant grain 23, while the sustain mode may utilize ramjet combustion. For instance, a pyrotechnic ignitor lights the solid propellant grain 23. The grain 23 burns and sends hot gases through the first nozzle 26 to accelerate the rocket to cruise speed. As the grain burns out, the pressure of the hot gases flowing through the first nozzle 26 decreases. The decrease triggers the ignition system 34 to burn rapidly and generate the deflagration pressure wave. The deflagration pressure wave fragments the first nozzle 26 into small pieces, which are rapidly expelled from the back of the fragmenting nozzle system 22 to expose the geometry of the second nozzle 28 and transition into the sustain mode. In the sustain mode the second nozzle 28 serves as a combustion chamber where hot gases produced by a gas generator propellant mix with air from a port cover to generate hot combustion gases through the second nozzle 28. In this regard, the divergent section 28c of the second nozzle 28 serves as a ramjet nozzle.

In a further example, the ignition system 34 includes one or more one linear ignition cords 34a. As an example, the linear ignition cords 34a can be, but are not limited to, flexible tubes filled with an explosive, such as pentaerythritol tetranitrate (PETN). Such cords 34a can readily be incorporated within the syntactic foam support 32. One non-limiting example cord is ITLX®. Alternatively, for detonation, the ignition cords 34a may include mild detonation cord (MDC) that has an explosive charge. The explosive may be, but is not limited to, hexanitrostilbene (HNS). MDC may include a metal-clad linear explosive, but it can also be rolled into non-circular or flat shapes.

One or more annular grooves 34b are formed in the outer surface of the first nozzle 26 and the cord or cords 34a are situated in the grooves 34b. Covers 34c can be provided over the cords 34a for retention. For example, the covers 34c are split rings that include two or more arc segments. The cord or cords 34a can be provided at selected axial and radial positions in the syntactic foam support 32, to promote more uniform fragmentation and/or reduce the potential for damage to the second nozzle 28.

The fragmenting and fragment-resistant materials of the respective nozzles 26/28 are selected with regard to the deflagration pressure wave, operational design loads and the like. For example, phenolic-based materials can be used as the fragment-resistant material. One example phenolic material is silica-filled phenolic. Alternatively, if higher fragment-resistance is needed, other composite, ceramic or metal alloys may be used.

The fragmenting material or materials can include cyanate ester compositions. The cyanate ester compositions herein are tailored, for example, to provide good strain tolerance and shear strength at elevated temperatures for nozzles but also good fragmentation with respect to the deflagration pressure wave for complete, or near complete, removal and ejection from the rocket motor 20. The properties of the cyanate ester compositions also enable relatively small throat angles of 30° or less, which facilitates compactness of the fragmenting nozzle system 22.

For example, the syntactic foam support 32 includes a cyanate ester-containing syntactic foam. The cyanate ester-containing syntactic foam can include, by weight, 40%-70% of cyanate ester resin. In a further example, the cyanate ester-containing syntactic foam also includes, by weight, 10%-40% of microspheres. The microspheres can include, but are not limited to, silica glass microspheres, polymer microspheres, ceramic microspheres, or combinations thereof. In a further example, the cyanate ester-containing syntactic foam also includes, by weight, 5%-40% of glycidal ether. The glycidal ether serves as a viscosity modifier and aids in thermal decomposition (e.g., a burn rate modifier). This permits a higher amount of the microspheres to be used, to further decrease weight. In an additional example, the cyanate ester-containing syntactic foam also includes, by weight, up to 15% silica selected from fumed silica, amorphous silica powder, silica glass fibers, and combinations thereof. The fumed silica and/or silica powder can be added as a viscosity modifier. The silica glass fibers can be added to enhance strength.

In an additional example, the cyanate ester-containing syntactic foam includes, by weight, 40%-70% of cyanate ester resin, such as Primaset™ BA-200 by Lonza, up to 2% 2-ethyl 4-ethyl imidazole catalyst, 5%-40% of butyl glycidyl ether, cresyl glycidyl ether, neopentyl glycol diglycidyl ether, 1,4-butanediol diglycidyl ether, castor oil polyglycidyl ether, or combinations thereof, up to 5% of fumed silica, up to 5% amorphous silica powder, up to 5% milled fiberglass, and 10%-40% of silica glass microspheres, such as those under the trade names S-60, S-32, or K-15 by 3M™.

The cyanate ester-containing syntactic foam can be fabricated by mixing together the composition constituents. The mixture is poured into mold and cured to form the desired geometry of the syntactic foam support 32. Post-cure processes may also be used to modify the properties.

In a further embodiment the syntactic foam includes benzoxazine, such as benzoxazine resin or polybenzoxazole. The chemical structure of benzoxazine includes an oxazine ring and a heterocyclic aromatic six-membered ring with oxygen and nitrogen, attached to a benzene ring. The benzoxazine foam is lightweight (e.g., less than 1.0 g/cm$^3$) and provides a thermal structural support for the ablative shell 30. For instance, the ablative shell 30 may contain an ablative and pyrolysis zone and the benzoxazine foam may provide the foam support 32 at a lower weight (e.g., more than 40% lower) and lower thermal conductivity (e.g., more than 50% greater) in comparison to silica-filled phenolic materials.

In embodiments, the benzoxazine foam is a combination of benzoxazine resin and other composition constituents. In a further example, the benzoxazine foam may have any of the above-described compositions of the cyanate ester-containing syntactic foam, but with benzoxazine resin rather than cyanate ester resin. In a further example, the benzoxazine foam is a combination of, by weight, 40-90% of benzoxazine resin, such as LOCTITE® BZ 9110 (Henkel Corporation), LOCTITE® BZ 9120 (Henkel Corporation) and/or LOCTITE® BZ 9130 (Henkel Corporation), with 5-40% butyl glycidyl ether, cresyl glycidyl ether, neopentyl glycol diglycidyl ether, 1,4-butanediol diglycidyl ether, and/or castor oil polyglycidyl ether, up to 3% fumed silica, up to 10% amorphous silica powder, up to 5% milled carbon or fiberglass, and 10-40% glass microspheres (e.g., S-60, S-32, K-15 or equivalent) and/or polymer microspheres and/or 10-40% ceramic microspheres (e.g., aluminum oxide, alumina, silicon carbide, boron carbide, or equivalent). These constituents may be mixed, poured into mold, and cured at 350-375° F. for at least 2 hours. The benzoxazine foam, and also the cyanate ester-containing syntactic foam, may generally withstand temperatures of approximately 350° F. to 600° F. before thermally decomposing. Thus, while stable at relatively lower temperature regimes, the foams are designed to thermally decompose at these temperatures to further facilitate shedding or discharge from the rocket motor 20.

The ablative shell 30 can be fabricated of a non-foam, cyanate ester-containing material. In a further example, the cyanate ester-containing material includes, by weight, 30%-65% of cyanate ester resin. In a further example the cyanate ester-containing material also includes, by weight, up to 35% of chopped quartz fiber, and by weight, up to 35% of glass selected from chopped glass fiber, milled glass fiber, and combinations thereof. In a further example, the cyanate ester-containing material also includes, by weight, up to 15% of amorphous silica powder. In a further example, the cyanate ester-containing material also includes, by weight, up to 65% of silica fabric.

In an additional example, the cyanate ester-containing material includes, by weight, 30%-65% of cyanate ester resin, such as Primaset™ PT-30 by Lonza, up to 2% of 2-ethyl 4-ethyl imidazole catalyst, and up to 35% quartz chopped fiber, and up to 35% chopped or milled glass fiber and up to 15% of amorphous silica powder. The fibers provide reinforcement that permits the strength to be tailored. Rather than the quartz chopped fiber and chopped or milled glass fiber, the cyanate ester-containing composition can include up to 65% of silica fabric and up to 15% of amorphous silica powder. The silica fabric provides a better distribution of reinforcement to potentially enhance resin wetting and erosion resistance compared to chopper or milled fibers, which may be difficult to evenly disperse in the resin. The powder is a flow modifier that facilitates the reduction of viscosity.

In further examples, the cyanate ester-containing material of the ablative shell 30 may be provided as a molding compound that has all the compositional constituents expect the silica fabric, which produces a macerated fiber molding compound. Alternatively, the molding compound has all the compositional constituents except for the quartz and glass fiber, which produces a pre-preg broadgood that can be cut into desired geometries. The molding compound can be compression molded and cured in the desired geometry of the ablative shell 30. Post cure processes may also be used to modify the properties.

Figure 3A:
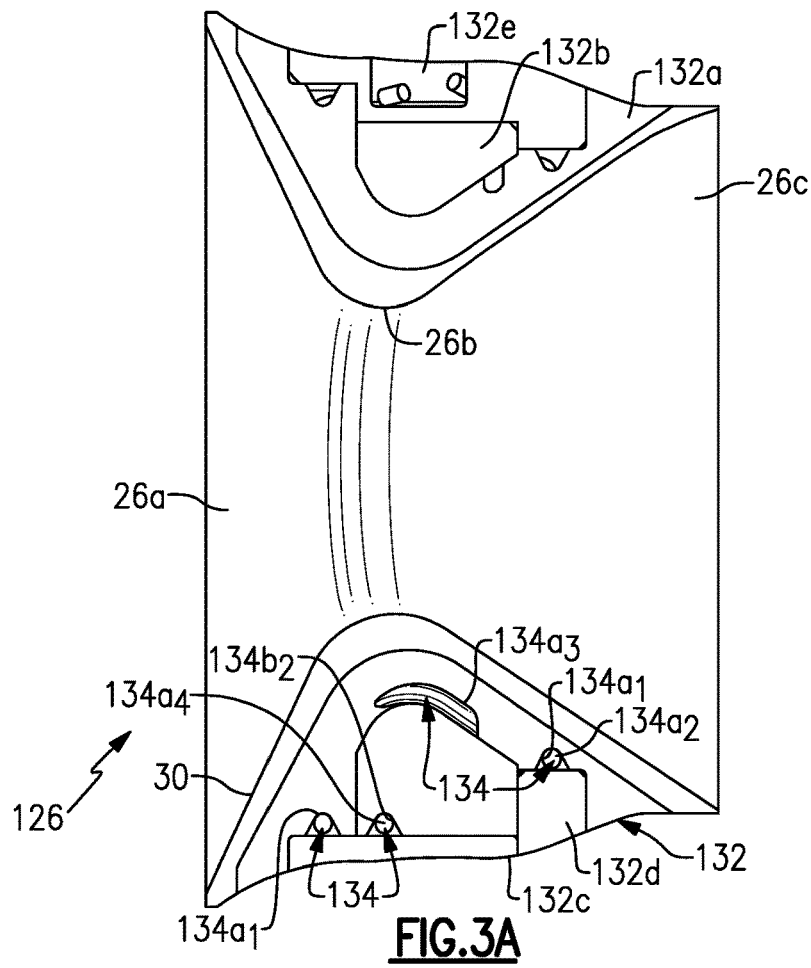
FIG. 3A illustrates a cross-section through an example first nozzle of a fragmenting nozzle system.

FIG. 3A illustrates another example of a first nozzle 126. In this disclosure, like reference numerals designate like elements where appropriate and reference numerals with the addition of one-hundred or multiples thereof designate modified elements that are understood to incorporate the same features and benefits of the corresponding elements. In this example, the first nozzle 126 includes the ablative shell 30, syntactic foam support 132, and ignition system 134. The syntactic foam support 132 is a multi-piece structure, and each piece can itself include multiple sub-pieces and/or arc-segments to facilitate assembly.

The multiple pieces of the syntactic foam support 132 include an inner shell 132a, an inner cap 132b, outer foam caps 132c/132d, and a foam junction box 132e. The inner shell 132a and inner cap 132b include, respectively, grooves $134b_1/134b_2$ for receiving the ignition system 134. The multi-piece construction permits integration of the ignition system 134 into the syntactic foam support 132 at desired axial and radial locations, to promote more uniform fragmentation and/or reduce the potential for damage to the second nozzle 28.

Figure 3B:
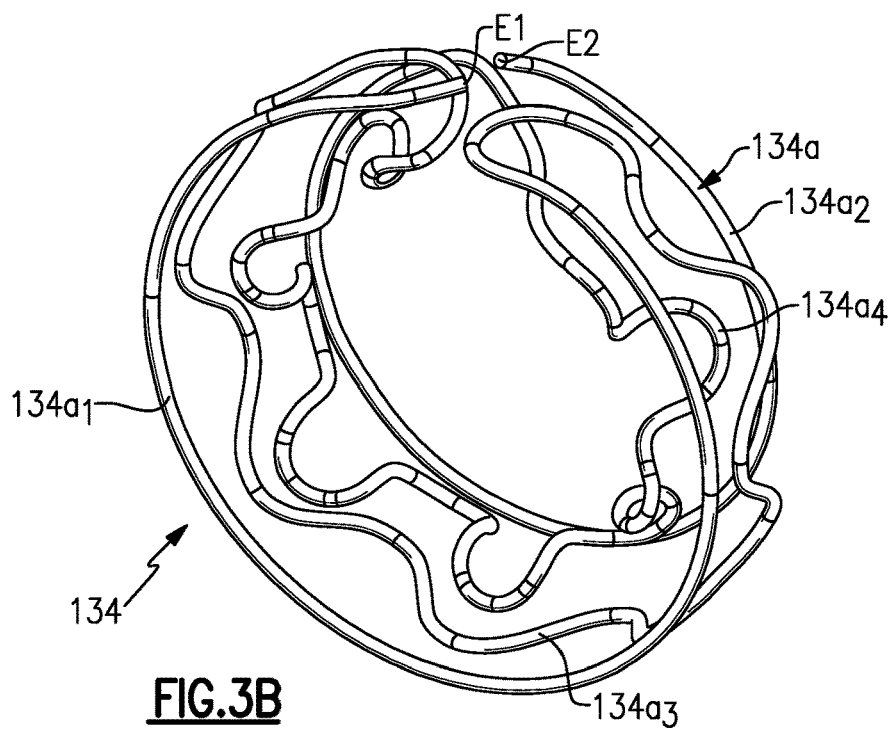
FIG. 3B illustrates an isolated view of an ignition system including an ignition cord.

In this example, the ignition system 134 includes an ignition cord 134a, which is shown in isolated view in FIG. 3B. The ignition cord 134a is shaped to promote more uniform fragmenting. The ignition cord 134a spans between terminal ends E1/E2 and includes annular portions $134a_1/134a_2$ and wave portions $134a_3/134a_4$. The annular portions $134a_1/134a_2$ include, respectively, the terminal ends E1/E2 and extend approximately 360°. The wave portions $134a_3/134a_4$ are located serially along the ignition cord 134a between the annular portions $134a_1/134a_2$. The wave portion $134a_3$ is radially outwards of wave portion $134a_4$. In this example, each of the wave portions $134a_3/134a_4$ extends in a three-dimensional pattern, i.e., circumferentially, axially, and radially.

Figure 4A:
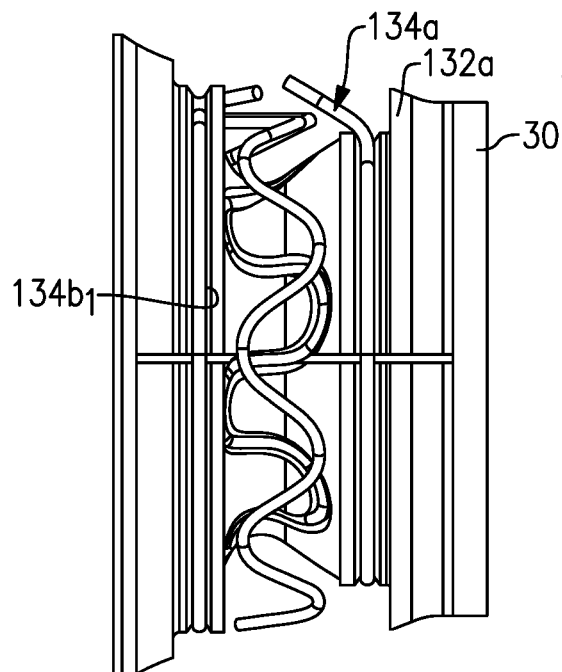
FIGS. 4A, 4B, 4C, and 4D illustrate a serial assembling of the first nozzle of FIG. 3A.
Figure 4B:
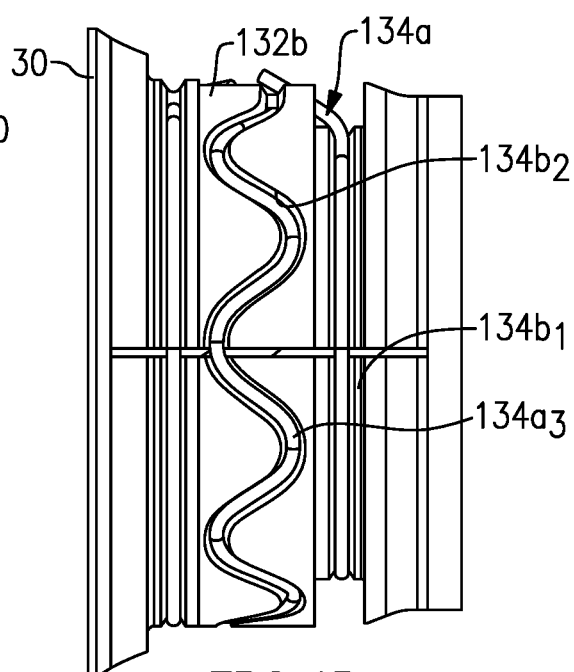
Figure 4C:
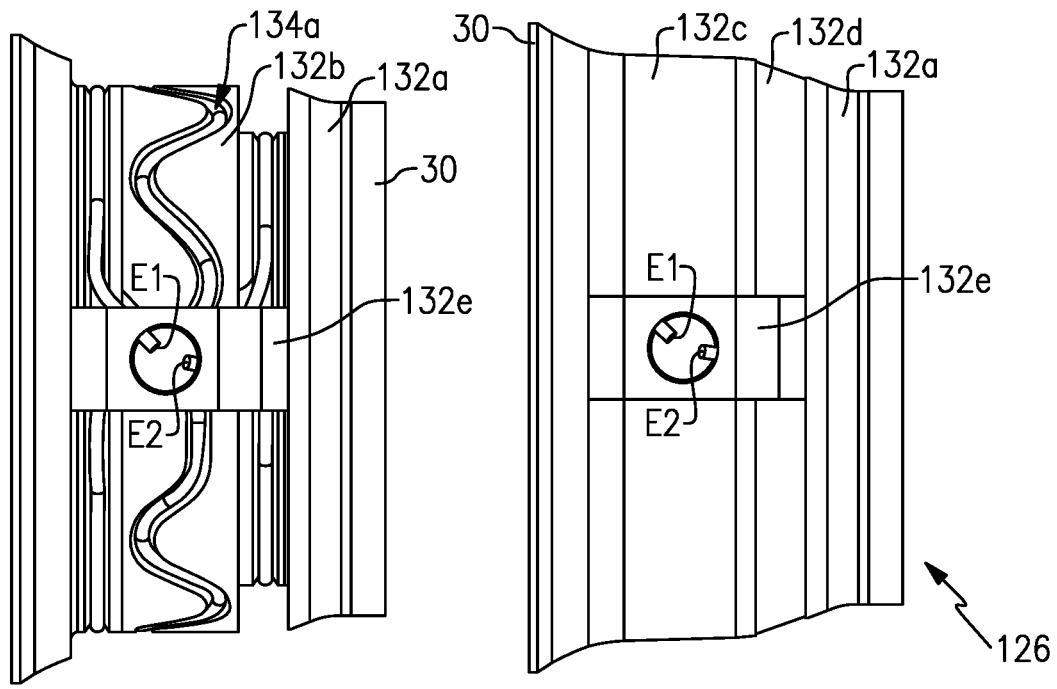
Figure 4D:
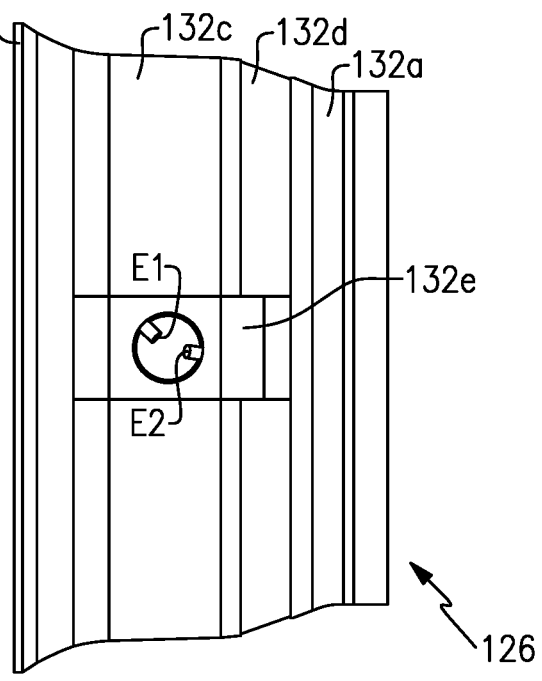

FIGS. 4A, 4B, 4C, and 4D illustrate the serial assembling of the first nozzle 126. In FIG. 4A the ignition cord 134a is assembled into the groove $134b_1$ of the inner shell 132a. In FIG. 4B the inner cap 132b is assembled such that the wave portion $134a_3$ of the ignition cord 134a is received in the groove $134b_2$. In FIG. 4C, the foam junction box 132e is assembled around the terminal ends E1/E2, and in FIG. 4D the outer foam caps 132c/132d are assembled to cover the exposed ignition cord 134a. The first nozzle 126 is thus easily assembled and the ignition system 134 provides more uniform fragmenting.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A fragmenting nozzle system comprising:
a first nozzle at least partially disposed within a second nozzle,
the first nozzle including an ablative shell, a syntactic foam support disposed between the ablative shell and the second nozzle, and an ignition system disposed at least partially within the syntactic foam support.

2. The system as recited in claim 1, wherein the syntactic foam support comprises benzoxazine.

3. The system as recited in claim 1, wherein the syntactic foam support includes benzoxazine resin and an ether.

4. The system as recited in claim 3, wherein the ether is selected from the group consisting of butyl glycidyl ether, cresyl glycidyl ether, neopentyl glycol diglycidyl ether, 1,4-butanediol diglycidyl ether, castor oil polyglycidyl ether, and combinations thereof.

5. The system as recited in claim 3, wherein the syntactic foam support includes fumed silica.

6. The system as recited in claim 3, wherein the syntactic foam support includes amorphous silica powder.

7. The system as recited in claim 3, wherein the syntactic foam support includes microspheres.

8. The system as recited in claim 7, wherein the microspheres are glass microspheres.

9. The system as recited in claim 7, wherein the microspheres are ceramic microspheres.

10. The system as recited in claim 7, wherein the syntactic foam support includes, by weight, 10%-40% of the microspheres.

11. The system as recited in claim 2, wherein the syntactic foam support includes, by weight, up to 15% silica.

12. The system as recited in claim 11, wherein the silica is selected from the group consisting of fumed silica, amorphous silica powder, silica glass fibers, and combinations thereof.

13. A fragmenting nozzle system comprising:
inner and outer convergent-divergent nozzles, the inner convergent-divergent nozzle lining an interior of the outer convergent-divergent nozzle and defining an initial nozzle throat geometry; and
an ignition system operable to trigger a controlled-energy deflagration pressure wave across the inner and outer convergent-divergent nozzles,
the inner convergent-divergent nozzle being formed of a fragmenting material with respect to the deflagration pressure wave and the outer convergent-divergent nozzle being formed of a fragment-resistant material with respect to the deflagration pressure wave such that upon triggering of the deflagration pressure wave, the inner convergent-divergent nozzle fragments and exposes a secondary, different nozzle throat geometry of the outer convergent-divergent nozzle.

14. The system as recited in claim 13, wherein the inner convergent-divergent nozzle includes a shell and a foam support, the shell includes cyanate ester and the foam support includes benzoxazine.

15. The system as recited in claim 14, wherein the foam support includes benzoxazine resin and an ether.

16. The system as recited in claim 15, wherein the ether is selected from the group consisting of butyl glycidyl ether, cresyl glycidyl ether, neopentyl glycol diglycidyl ether, 1,4-butanediol diglycidyl ether, castor oil polyglycidyl ether, and combinations thereof.

17. The system as recited in claim 14, wherein the foam support includes silica selected from the group consisting of fumed silica, amorphous silica powder, silica glass fibers, and combinations thereof.

18. The system as recited in claim 14, wherein the foam support includes microspheres.

19. The system as recited in claim 14, wherein the shell is a non-foam.

20. A fragmenting nozzle system comprising:
   inner and outer convergent-divergent nozzles, the inner convergent-divergent nozzle lining an interior of the outer convergent-divergent nozzle and defining an initial nozzle throat geometry; and
   an ignition system operable to trigger a controlled-energy detonation pressure wave across the inner and outer convergent-divergent nozzles,
   the inner convergent-divergent nozzle being formed of a fragmenting material with respect to the detonation pressure wave and the outer convergent-divergent nozzle being formed of a fragment-resistant material with respect to the detonation pressure wave such that upon triggering of the detonation pressure wave, the inner convergent-divergent nozzle fragments and exposes a secondary, different nozzle throat geometry of the outer convergent-divergent nozzle.

* * * * *